US008819953B2

(12) United States Patent
Andersson et al.

(10) Patent No.: US 8,819,953 B2
(45) Date of Patent: Sep. 2, 2014

(54) METHOD AND DEVICE FOR MEASURING CYLINDERS

(75) Inventors: Thomas Andersson, Vallentuna (SE); Paolo Gaboardi, Fino Mornasco (IT); Massimiliano Giucolsi, Legano-Milano (IT); Fabrizio Porta, Arconate-Milano (IT)

(73) Assignee: Tenova S.p.A., Milan (IT)

( * ) Notice: Subject to any disclaimer, the term of this patent is extended or adjusted under 35 U.S.C. 154(b) by 233 days.

(21) Appl. No.: 13/509,686

(22) PCT Filed: Dec. 10, 2010

(86) PCT No.: PCT/EP2010/007626
§ 371 (c)(1),
(2), (4) Date: May 17, 2012

(87) PCT Pub. No.: WO2011/076356
PCT Pub. Date: Jun. 30, 2011

(65) Prior Publication Data
US 2012/0246956 A1    Oct. 4, 2012

(30) Foreign Application Priority Data

Dec. 21, 2009  (IT) .............................. MI2009A2248
Oct. 25, 2010  (IT) .............................. MI2010A1958

(51) Int. Cl.
| G01B 5/08 | (2006.01) |
| G01B 3/20 | (2006.01) |
| G01B 5/10 | (2006.01) |
| G01B 5/20 | (2006.01) |
| G01B 5/252 | (2006.01) |

(52) U.S. Cl.
CPC .. *G01B 3/20* (2013.01); *G01B 5/08* (2013.01); *G01B 5/10* (2013.01); *G01B 5/201* (2013.01); *G01B 5/252* (2013.01)
USPC ......................................... 33/555.1; 33/555.3

(58) Field of Classification Search
CPC ............ G01B 5/08; G01B 5/252; G01B 2/10; G01B 5/201; G01B 3/20
USPC ..................... 33/555.1, 555.3, 550
See application file for complete search history.

(56) References Cited

U.S. PATENT DOCUMENTS

| 181,809   | A | * | 9/1876 | Williams ...................... 33/555.3 |
| 1,195,330 | A | * | 8/1916 | Binney ......................... 33/555.3 |
| 1,345,071 | A | * | 6/1920 | Butler .......................... 33/555.3 |

(Continued)

FOREIGN PATENT DOCUMENTS

| JP | 58080501   | 5/1983 |
| WO | 2005064267 | 7/2005 |

*Primary Examiner* — Christopher Fulton
(74) *Attorney, Agent, or Firm* — Themis Law

(57) ABSTRACT

An apparatus for revealing the geometry of operative cylinders, in particular during the grinding operation of the same, includes a pair of movable clamps which can be moved away from and towards each other with respect to a fixed intermediate structure, the clamps having tilted surfaces in opposite directions to each other according to a swallowtail arrangement with respect to a cylinder being measured, positioned between them and between a surface of the fixed intermediate structure, the surfaces of the movable clamps and the surface of the fixed intermediate structure always being kept in contact with the cylinder, whether still or rotating, wherein the fixed structure also has, in its interior, parts of a group which interact with each other to correlate the movement of the clamps.

9 Claims, 7 Drawing Sheets

(56) References Cited

U.S. PATENT DOCUMENTS

| | | | |
|---|---|---|---|
| 2,469,613 A * | 5/1949 | Subber | 33/501.2 |
| 2,603,043 A * | 7/1952 | Bontemps | 451/25 |
| 3,568,372 A * | 3/1971 | Asano et al. | 451/9 |
| 3,802,087 A * | 4/1974 | Raiteri | 33/555.1 |
| 5,088,207 A | 2/1992 | Betsill | |
| 5,551,906 A * | 9/1996 | Helgren | 451/8 |
| 6,159,074 A * | 12/2000 | Kube et al. | 451/8 |
| 7,752,770 B2 * | 7/2010 | Molmann | 33/679.1 |
| 7,909,676 B2 * | 3/2011 | Boselli et al. | 451/8 |
| 2009/0031574 A1 | 2/2009 | Waltz | |
| 2011/0237159 A1 * | 9/2011 | Araki et al. | 451/5 |

* cited by examiner

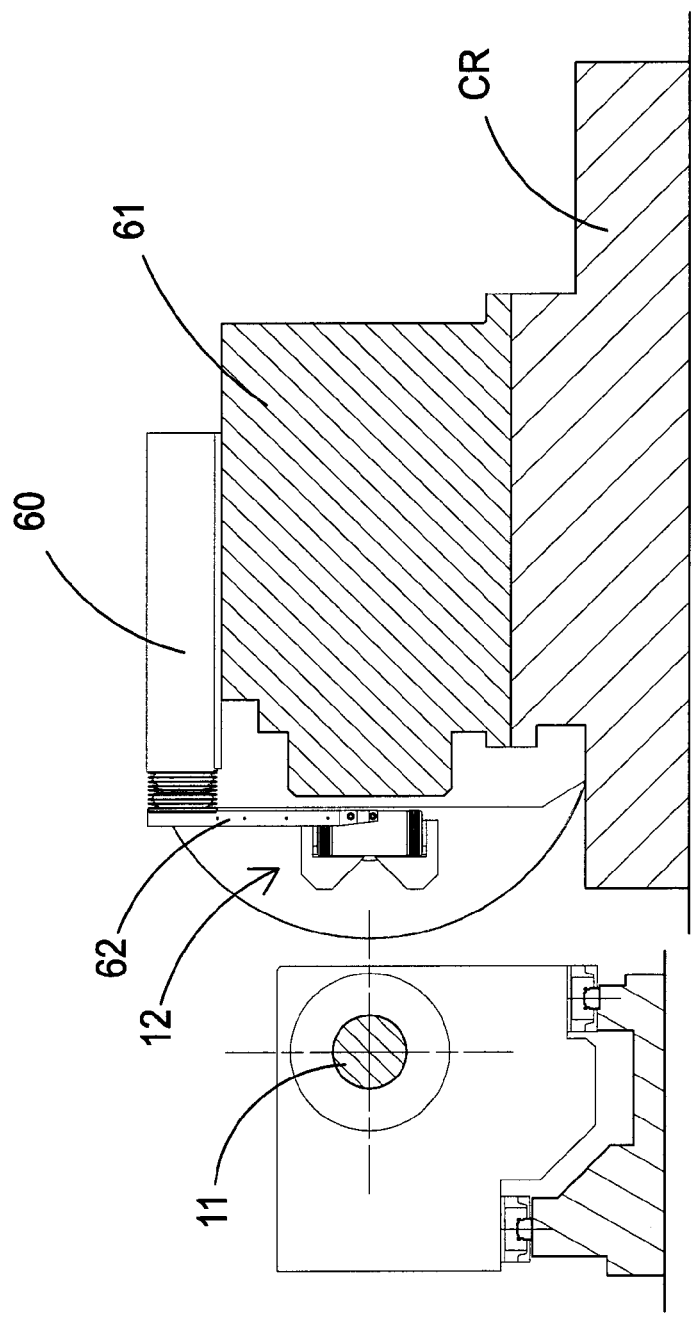

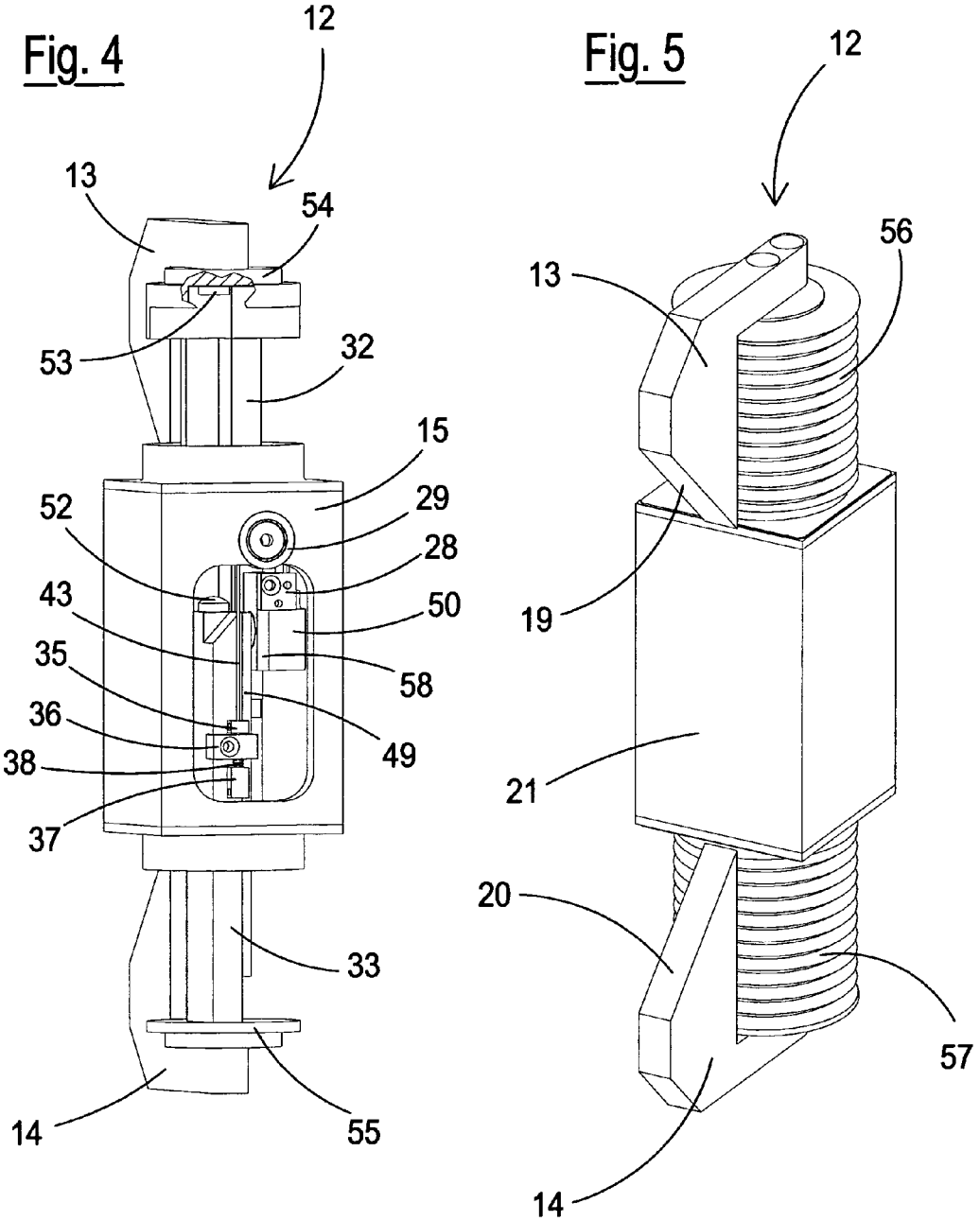

METHOD AND DEVICE FOR MEASURING CYLINDERS

FIELD OF THE INVENTION

The present invention relates to a method and apparatus for revealing the geometry of operative cylinders, for example cylinders for the processing of materials, such as those used in rolling mills.

A method and apparatus according to the invention are particularly, but not exclusively, suited for use in the grinding operation of said operative cylinders.

Furthermore, a method and apparatus according to the invention can be equally applied not only to cylinders in rolling mills for obtaining strips of metallic material, but also in other fields, comprising the grinding processing of cylinders, rolls and similar articles for the paper industry and, more generally, of flat non-ferrous laminates, and/or fields such as the construction of marine engines and/or hydraulic systems having large dimensions, i.e. for industrial applications in general.

BACKGROUND OF THE INVENTION

As is well-known to experts in the field, rolling mills have the function of reducing the thickness of raw materials (whether they be steel, aluminium or other material) to the required dimension.

Rolling mill cylinders are designed for transferring the load necessary for the deformation of the material from the fixed structure (rolling mills cage) to the strip.

During the rolling mill process, the loads generated by direct contact with the strip or with other cylinders (in the case of intermediate and resting cylinders), accidental stress and, in many cases, exposure to high temperatures, produce phenomena of wear, fatigue and various types of damage in the same cylinders. These phenomena, of a mechanical and thermal origin, deteriorate the surface of the cylinders and, on the one hand, cause faults such as, for example, errors in the form, dents or variations in the roughness which reduce the quality of the strip and consequently its sales price. On the other hand, they can also cause faults of a structural type (such as burns and cracks, for example) which can lead to catastrophic events, such as the breakage of the cylinder during rolling mills process, which lead to even more serious economic losses.

The cylinders are consequently dismantled cyclically from the cages, their geometrical characteristics are measured, analyzed with Non-Destructive Control (NDC) techniques and re-conditioned by grinding before being re-admitted to operation. As a result of the high investment necessary for a set of cylinders, each innovation which reduces measurement and re-conditioning times, increases cylinder precision and reliability, and prolongs their operative life, results in a net and tangible profit for the laminate producer.

In particular, the current prospect of devices for revealing the geometry of operative cylinders is characterized by particularly complex and costly solutions in which the detection of the geometry of the cylinder is effected by machines with multiple measuring points with maintenance requirements, due to their complexity, which are also onerous.

A solution of this type is proposed in WO2006084072.

Furthermore, U.S. Pat. No. 6,159,074, or JP 8285504 describe gauges with two measurement points capable of measuring form errors based on two reading instruments arranged in diametrically opposite positions or on a single instrument assisted by a fixed swallowtail. In these cases, however, the constructive simplicity and limited cost are achieved to the detriment of the precision, measurement reliability and critical nature and complexity of the calibration of the instrument.

SUMMARY OF THE INVENTION

A general objective of the present invention is therefore to provide a measurement apparatus which solves the drawbacks of the known art by finding a simplification, which is in any case capable of maintaining the reliability and accuracy required for this type of measurement.

A further objective is to provide an apparatus for revealing the geometry of cylinders, in particular during the grinding operation, which is extremely simple, economical and particularly functional.

In view of the above objectives, according to the present invention, a method and apparatus have been conceived for revealing the profiles of cylinders having the features described herein.

BRIEF DESCRIPTION OF THE DRAWINGS

The structural and functional features of the present invention and its advantages with respect to the known art will appear more evident from the following description, referring to the enclosed drawings, which show an embodiment of the apparatus produced according to the invention.

In the drawings:

FIG. 3 is a schematic view which shows the apparatus installed on a grinding machine;

FIGS. 4 and 5 are partly sectional perspective views of the apparatus according to the invention in one of its embodiments;

DETAILED DESCRIPTION OF EMBODIMENTS OF THE INVENTION

Figure 1:
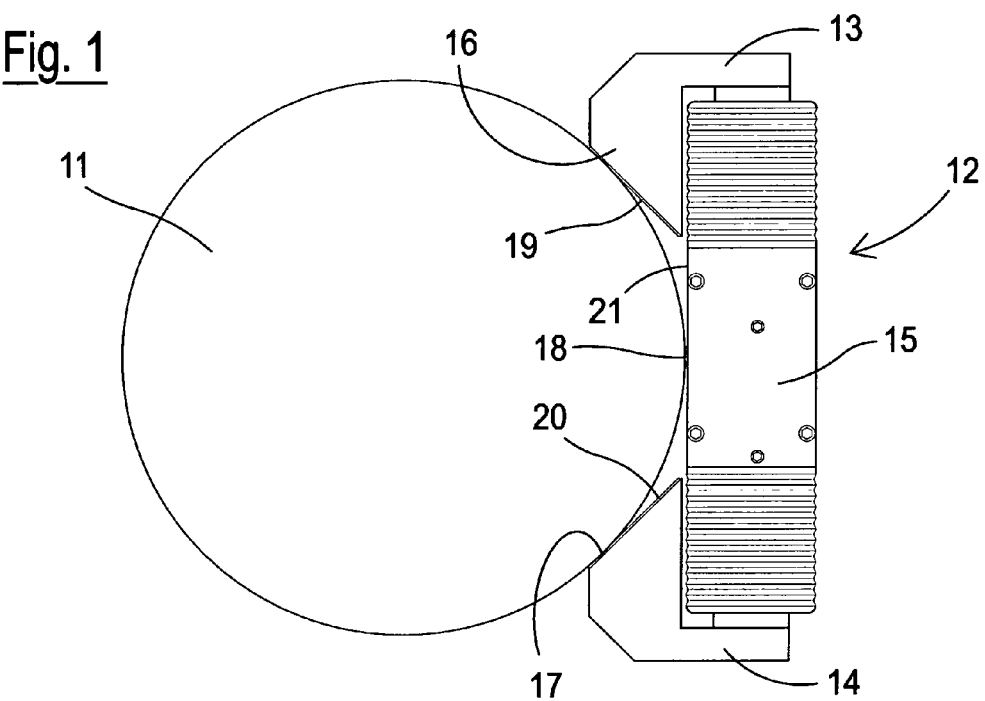
FIG. 1 is a raised side view which shows, in an extremely schematic manner, an apparatus according to the invention which can be positioned for example on a grinding machine (not shown)

It is known that a grinding machine on which the apparatus, object of the invention, can be installed, comprises a grinding trolley CR which slides on a base, and that said grinding trolley CR in turn supports a grinding head 61 equipped with the relative grindstone. With reference to FIG. 3, it should be pointed out that an apparatus such as that illustrated therein can be assembled in front of a grinding machine for cylinders, rolls and the like, whatever their operative destination may be. This solution can be achieved by assembling the apparatus, instead of on the grindstone-holder head or grindstone-holder trolley, on a specific trolley which slides on a further base situated on the opposite side of the grindstone-holder head with respect to the cylinder.

An apparatus according to the invention 12 is generally assembled on an independent system (FIG. 3), such as for example a fixed structure 60 integral with a head 61 of the machine or grinding machine.

A movable part 62, which slides in its interior thanks to linear guides and to a control device, for example pneumatic, is integral with an apparatus 12 whose interior contains movable parts which effect the detection of the geometry of the cylinders indicated above.

The apparatus of the invention 12 has, as its first particular feature, that of using three points for revealing the geometry of the cylinder, of which two are obtained by the movable devices and one obtained with a fixed part.

FIG. 1, in fact, shows how the cylinder 11 is arranged between a pair of clamps, an upper clamp 13 and a lower clamp 14, which can be moved away from and towards each other, with respect to an intermediate fixed structure 15.

It should be pointed out that these movable parts do not have their own driving system, as they are moved directly by the combination of the thrust that the driving system of the movable part 62 exerts against the cylinder to be measured and by the particular conformation of the measuring clamps which exploits the principle of the sloping plane.

Figure 2:
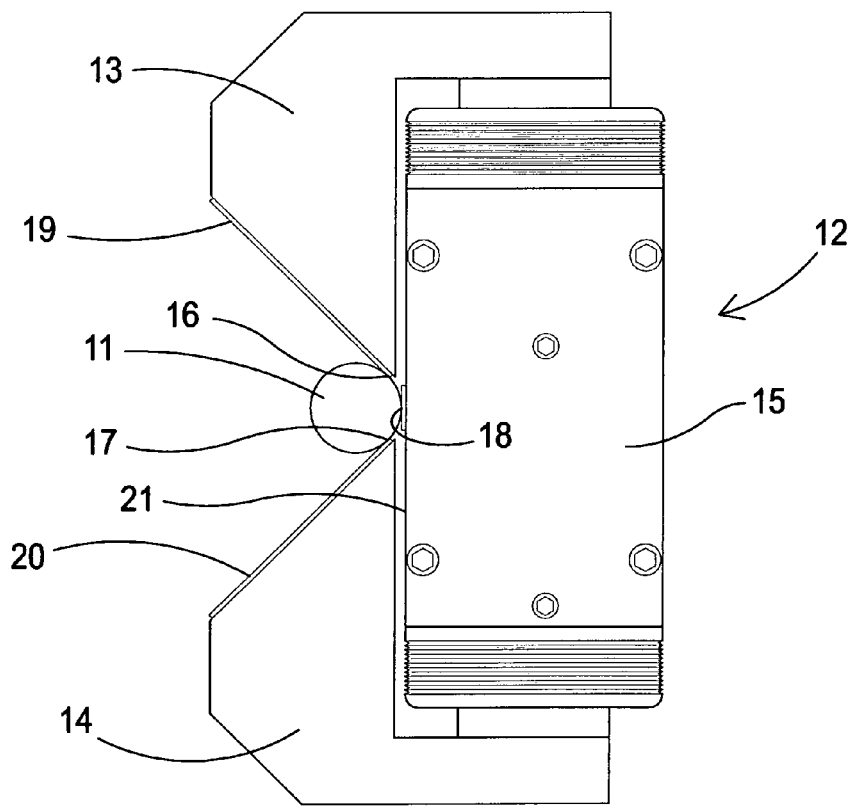
FIG. 2 is a raised view similar to that of FIG. 1, in which the apparatus is measuring a cylinder having extremely limited dimensions with respect to that of FIG. 1.

This movement, together with the geometry of the system, allows the cylinder 11 to always have three limited contact points or areas with respect to the apparatus of the invention with both one cylinder 11 having a certain dimension (FIG. 1) and with a cylinder 11 having a minimum dimension (FIG. 2).

The two clamps 13 and 14 are in fact produced with tilted contact surfaces 19 and 20 with respect to the cylinder 11 in opposite directions according to a swallowtail ("V") arrangement, so that the limited contact points or areas with the cylinder 16 (upper point) and 17 (lower point) slide along the tilted surfaces 19 and 20 with a variation in the diameter of the cylinder. This arrangement also allows the cylinder to also be contemporaneously in contact with a fixed point or limited area 18 of a surface 21 of the fixed intermediate structure 15 situated between the two clamps 13 and 14.

The swallowtail arrangement envisages that the contact surfaces 19 and 20 have a fixed angulation even if they are free to move away from and towards each other.

The apparatus of the invention therefore envisages that, in addition of being a three-pointed gauge, moreover two contact points are movable, i.e. the points 16 and 17 defined on the contact surfaces 19 and 20 of the clamps 13 and 14, and one contact point is fixed, i.e. the point 18 of the surface 21 of the fixed intermediate structure 15.

According to the method of the invention, the three points 16, 17 and 18 must always be kept in contact with the surface of the cylinder 11 during all the measuring phases, regardless of whether the cylinder is still or in rotation.

In this way, by maintaining the contact between the surface 21 and the cylinder 11, if the inclination angle of the contact surfaces 19 and 20 of the clamps 13 and 14 is known, and if the relative distance between the same clamps 13 and 14 is known, it is possible to detect the diameter of the cylinder 11.

Furthermore, by sliding the device along the axis of the cylinder, it is possible to reveal the profile of the generatrix of the cylinder itself.

Finally, by rotating the cylinder 11, the eccentricity and rotundity error of the section of the cylinder in correspondence with the measurement points of the device, is revealed.

The results described above are obviously obtained by processing the data received from the gauge by means of appropriate algorithms.

The correct general geometry of the cylinder being processed can thus be reconstructed. Furthermore, this continuous detection makes it possible to intervene in continuous to suitably actuate the grindstone of the grinding machine in order to recondition the cylinder being processed with the desired geometrical parameters.

The apparatus, which can be applied to a wide variety of diameters of cylinders, from the "thinnest" (such as "Sendzimir") to the largest, therefore functions contemporaneously with the grinding process, has great constructive simplicity and guarantees the precision necessary for controlling the processing in real time.

Furthermore, this invention can be easily applied to a specific truck situated in a position diametrically opposite to the grindstone with respect to the cylinder and sliding on a further base; this solution allows the measurement device to operate independently with respect to the grindstone-holder trolley.

Some details of the illustrated embodiment are now described, which allow the performances, object of the present invention, to be obtained. All the mechanisms which allow the determination of the geometry of the cylinder 11 are housed inside the fixed structure 15.

More specifically, according to the illustrated embodiment, an upper arm 32 and a lower arm 33 slide in its interior thanks to linear guides.

The movement of the two arms 32 and 33 is synchronous and in opposite directions, i.e. as the upper arm 32 moves upwards, the lower arm 33 move downwards and vice versa.

Figure 6:
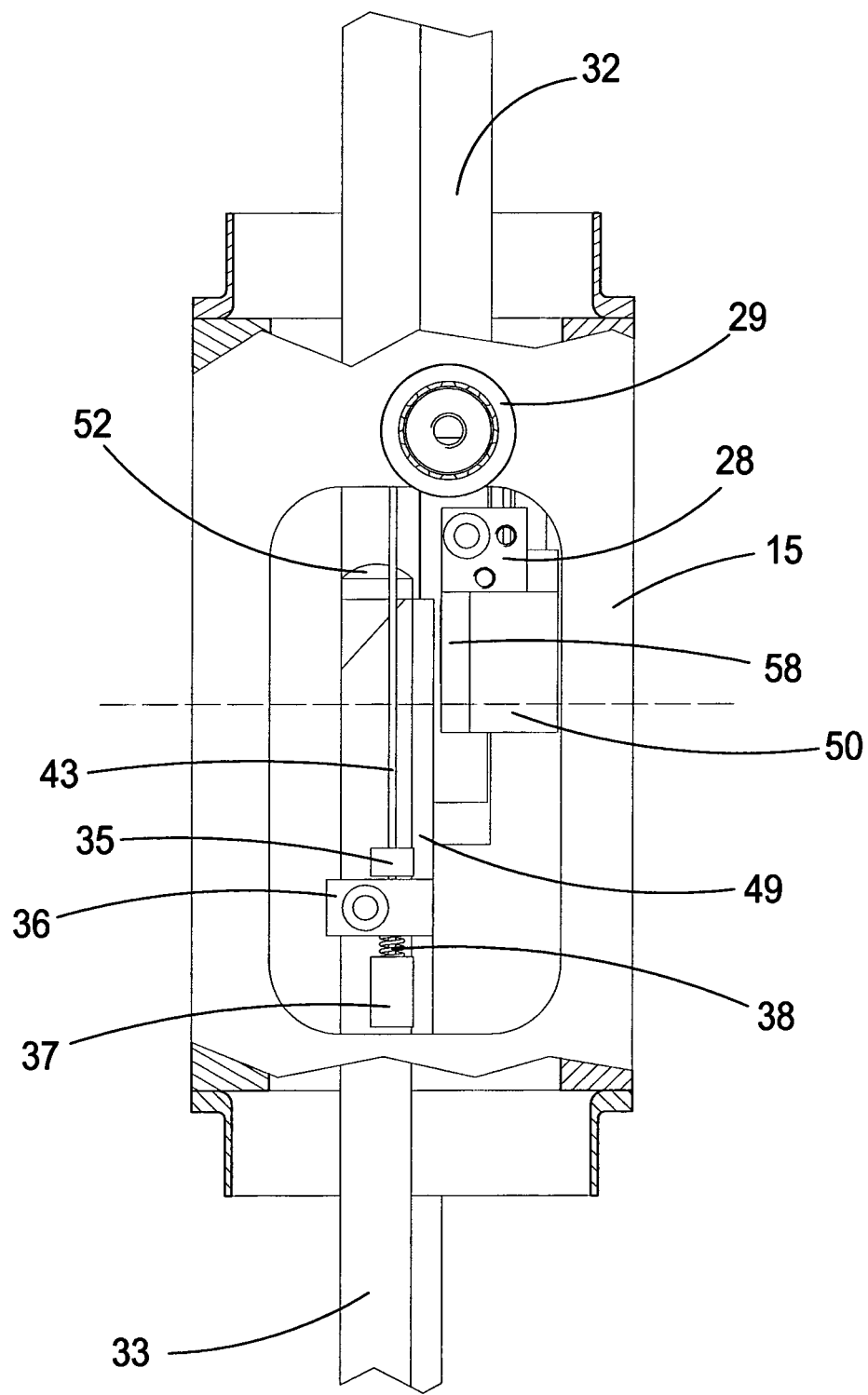
FIG. 6 is an enlarged view of a detail of FIG. 4.

This specific feature of the movement of the two arms 32, 33 is enabled by a connection by means of a cable or wire or pulley system. The means whereby the connections between the upper arm 32 and lower arm 33 are obtained with a cable or wire 43 (FIGS. 4, 5 and 6) are the following.

On the upper arm 32, the connection between the wire 43 and the same arm is obtained with a stop 28, screwed onto the arm itself, in which the wire 43 is blocked.

The wire 43 rises from the stop 28 and is wound onto a pulley 29 situated in the upper part of the fixed structure 15. After completing a half-turn around the pulley 29, the wire 43 descends to be connected to the lower arm 33 passing through three blocks:

A first block 35, which is not integral with the arm 33, but is integral with the wire 43; a second block 36 which is integral with the lower arm 33, but not with the wire 43 so that the latter can run freely through a hole (not shown) provided in the block itself 36; and a third block 37, which again is not connected to the arm 33 but to the wire 43, forming the final stop for the wire 43 and the reaction point for the spring 38.

It should also be pointed out that the lower end of the block 36 and the upper end of the block 37 are shaped so as to guarantee the housing of the spring, ensuring the optimum positioning and at the same time guaranteeing the stability of its coupling with the two blocks 36 and 37.

Figure 10:
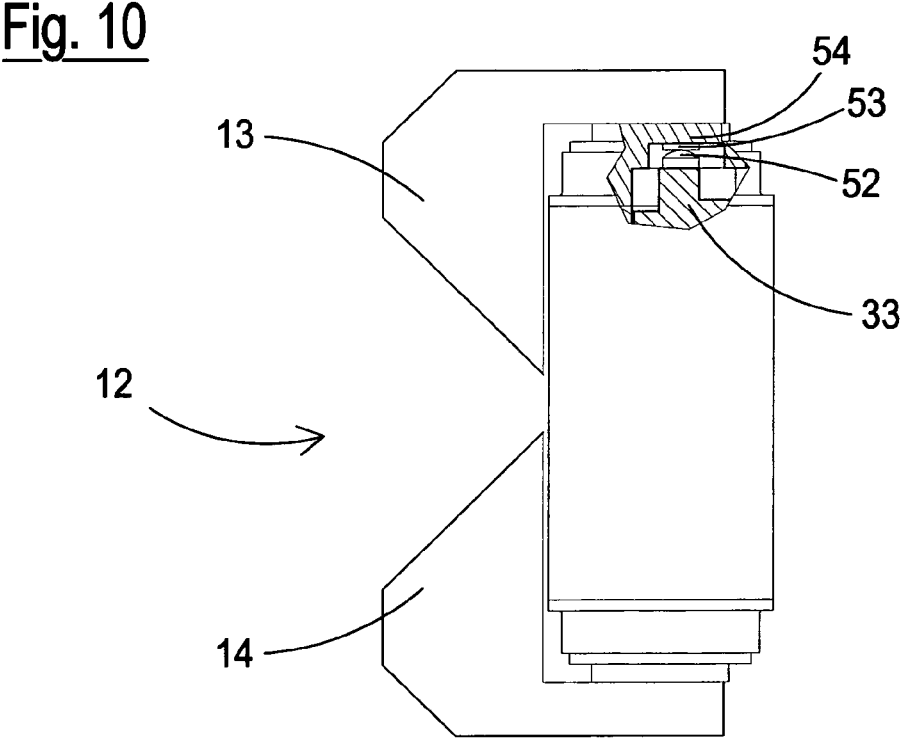
FIG. 10 is a partially sectional, raised side view of the apparatus of FIGS. 1-9, to illustrate some of the details.

It should also be pointed out that the movable part or upper arm and the movable part or lower arm have a different weight. In particular, the upper arm 32 has a greater weight and the difference in weight between the two is capable of lifting the lower arm 33 so that, when the device is at a standstill, i.e. there is no cylinder between the two clamps 13 and 14, the upper clamp descends and entrains the lower clamp upwards, until the devices 52 and 53 assembled on the lower arm 33 and on the upper stopper 54 respectively, touch and the system is in equilibrium (FIG. 10).

The good functioning of the device implies that the two measurement clamps 13 and 14 are constantly in contact with the cylinder to be measured, also in the presence of small asymmetries of the profile of the cylinder itself due, for example, to eccentricity or rotundity errors which cause, at a certain moment, the distance between the con-tact points (between the cylinder and the relative clamp) and the theoretical axis of the cylinder (or machine axis, or the joining of the centres which support the cylinder) to be not exactly equal.

This requisite requires that there be a free interaction between the two clamps, a feature which cannot be guaranteed by a simple connection with the pulley and cable. Consequently, in order to allow small variations, or micro-variations of the position of the lower clamp 14 with respect to the upper clamp 13, the lower arm 33 (and the clamp connected to it) is pushed upwards by the spring 38 described above. During the activation of the measuring device, the preloading of the spring 38 is generated by an offset of the position of the centerline of the apparatus 12 with respect to the theoretical axis of the cylinder 11 in a vertical direction according to the following description: when the device 12 approaches the cylinder 11, thanks to the control of the movable arm 62, the lower clamp 14 touches the cylinder before the upper clamp, causing a downward shift of the lower arm 33 connected to it, which compresses the spring 38. The above offset is calculated so that the upper clamp touches the surface of the cylinder before the present preloading of the spring 38 (which is equal to the product of the offset run for the elastic constant of the spring) exceeds the weight of the upper movable part; in particular, the system is dimensioned so that the spring allows a further preloading during the functioning of the system, and therefore a further relative distancing of the two arms 32, 33, before said preloading becomes equal to the weight of the upper movable part, causing the detachment of the same from the cylinder.

Figure 11:
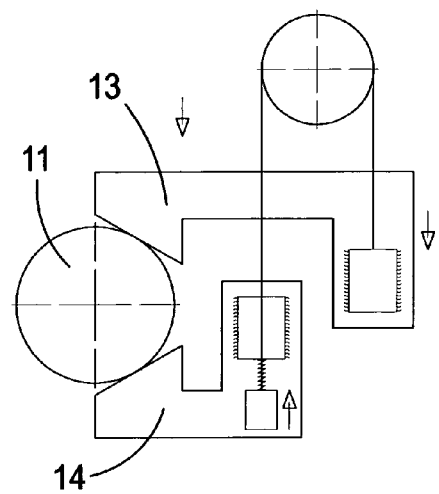
FIGS. 11 to 14 are schematic views illustrating four different operative behaviours of the method and apparatus according to the invention.

In this way, the result of having a system with the two clamps always in contact with the cylinder is obtained in a purely mechanical way and therefore with a simple and reliable device. This device, in the presence of small differences or micro-differences between the distance of the contact points between the clamps and the theoretical axis of the cylinder itself, behaves as follows:

If the upper contact point moves towards the center: the upper arm descends due to the force of gravity and the tension of the wire compresses the spring 38 by an amount equal to the shift considered. This shift generates an increase in the preloading of the spring; for the good functioning of the apparatus, it is important for the weight force of the upper arm to be capable of generating this further preloading, otherwise there would be no contact between the upper clamp and the cylinder (FIG. 11).

Figure 12:
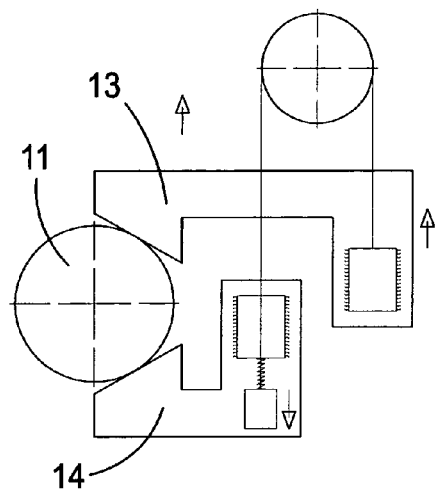

If the upper contact point moves away from the center: the upper arm is lifted as it is pushed by the profile of the cylinder, the consequent loss of tension of the wire is compensated by an extension of the spring (i.e. a loss in the preloading of the same) equal to the shift considered. Due to the way in which it is constructed, the apparatus is capable of compensating this type of shifts, until the initial preloading of the spring is zeroed, from this point on there is no contact between the lower clamp and the cylinder (FIG. 12).

Figure 13:
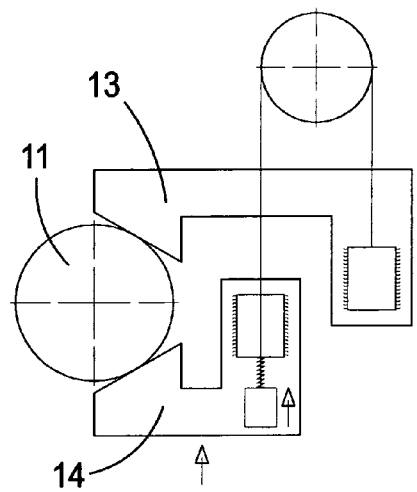

If the lower contact point moves towards the center: the lower arm is lifted to maintain contact with the cylinder as it is pushed by the spring 38, which is unloaded by an amount equal to the shift considered. The apparatus is capable of compensating this type of shift, until the initial preloading of the spring is zeroed, from this point on there is no contact between the lower clamp and the cylinder (FIG. 13).

Figure 14:
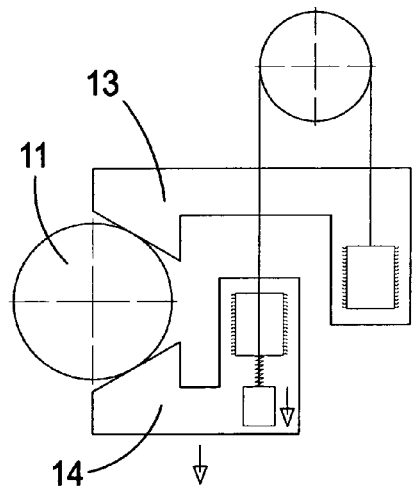

If the lower contact point moves away from the center: the lower arm is lowered compressing the spring and consequently increasing the preloading. The good functioning of the apparatus is guaranteed as long as the preloading of the spring does not reach values which are such as to cause the detachment of the upper clamp form the cylinder (FIG. 14).

Another advantage of the free interaction between the two clamps described above, moreover, is that the system is capable of perfectly exerting its function also in the presence of small misalignments between the axis of the cylinder and the axis of the device, object of the present invention, due, for example, to the construction and assembly tolerances of the device itself and machine on which it is installed.

The components of the measurement device composed of an optical line 49 and a reading device 50, are also fixed on the two arms 32, 33. The optical line 49 is fixed onto the lower arm 33 whereas the reading device 50 is housed in a support 58 fixed to the upper arm 32. The optical line 49 is of the incremental type i.e. it measures the relative shift between the two arms but is not capable of give the absolute value of the distance between the two clamps 13 and 14. In order to have a reference point which represents the zero of the system, a reference 52 is installed on the lower arm 33 and a reference 53 on the upper stopper 54 (which is constrained to the upper arm 32). In this way, as the details 52 and 53 are in contact when the gauge is not operating (FIG. 10), i.e. when there is no cylinder between the two clamps, with each start-up of the device, the relative position between the optical line and reading device which defines the zero of the measurement system, is registered.

It should be pointed out, however, that with the first start-up of the system, the diameter of a sample cylinder having a known diameter (dima) must be revealed; this measurement is used to assign a reference value to the zero position described above which is functional for effecting the measurements.

In order to protect the devices contained inside the fixed part 15 from the intrusion of liquids and processing residues, two bellows are installed, an upper one 56 and a lower one 57, which are connected to the upper stopper 54 and to the lower stopper 55 respectively. Furthermore, in order to improve the sealing of these two bellows, air is introduced inside the structure 15 with a slight pressure which forms an inlet barrier for contaminating agents.

In short, the functioning of the whole apparatus 12 is as follows.

In rest position, the movable part 62 of the apparatus (as schematized in FIG. 3) is positioned in the fixed structure 60, integral with the support of the measurement apparatus or grinding machine and the two arms 32 and 33 of the body of the apparatus or gauge are at run-end, with the detail 52 of the lower arm, in contact with the detail 53 of the upper arm.

Figure 7:
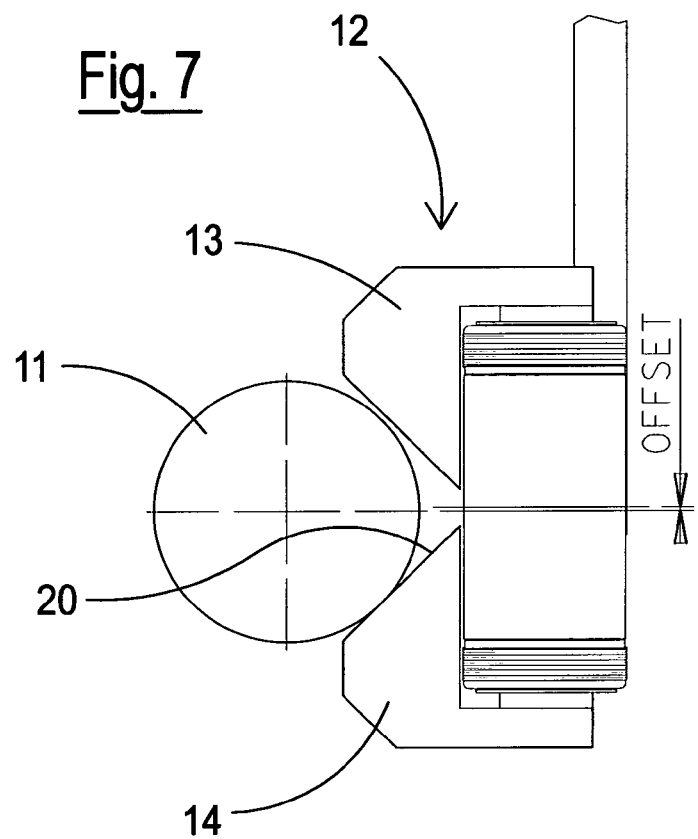
FIGS. 7 to 9 are schematic views similar to those of FIGS. 1 and 2 in various functioning phases.

In order to effect the measurement, the movable part 62, with which the apparatus 12 is integral, of the gauge is pushed towards the cylinder 11 until the surface 20 of the lower clamp 14 touches the cylinder 11 (FIG. 7).

The movable arm 62 continues to advance towards the cylinder 11 and, due to the tilted surface 20 of the clamp 14, a downward shift of the lower arm 33 is generated, which determines the preloading of the spring 38 as, as already mentioned, this preloading is less than the weight of the upper arm.

From what is specified above, in this way, the continuous contact between both clamps 13, 14 and the cylinder is guaranteed also in the presence of faults (asymmetries) of the cylinder.

Figure 8:
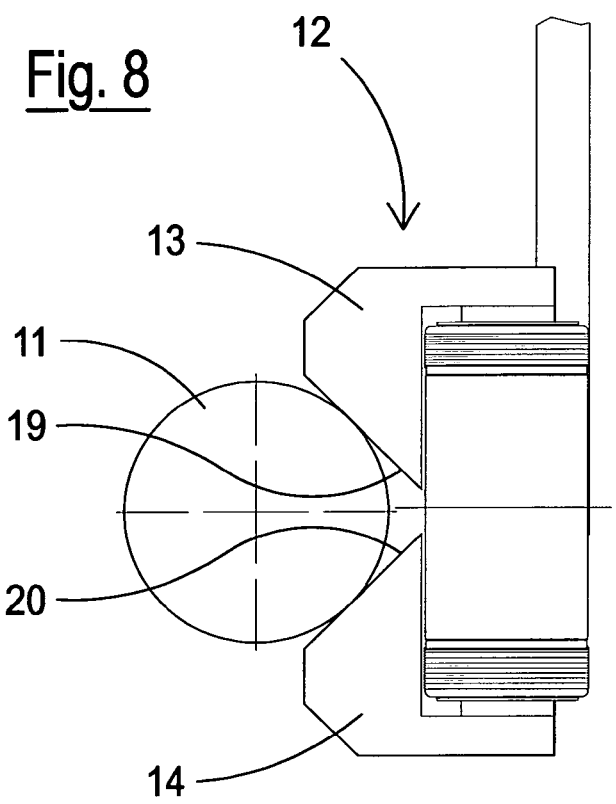
Figure 9:
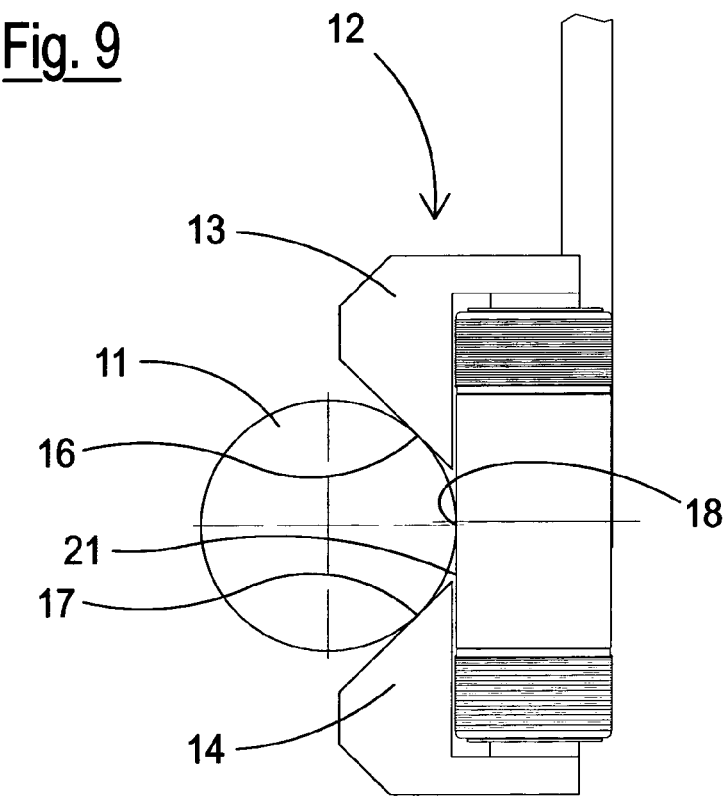

The arm 62 of the gauge continues to advance until the upper clamp 13 is also in contact with the cylinder through the surface 19 (FIG. 8); we repeat that the geometry of the system has been studied so that, when the upper clamp 13 touches the cylinder 11, the spring 38 can still be preloaded to a certain extent without the sum of the forces thus generated causing the detachment of the upper clamp 13 from the cylinder 11. The particular V-shape of the clamps of the gauge ensures that, while the gauge is moving towards the cylinder 11, the upper arm 32 and the lower arm 33 move respectively upwards and downwards. The advancing of the arm 62 of the gauge towards the cylinder 11 continues until the surface 21 of the fixed part 15 of the body of the gauge comes into contact with the cylinder 11 (FIG. 9), producing the central contact point 18 and, at the same time, mechanically stopping the run of the arm 62, without the help of other electromechanical devices of the position control.

In this way, three contact points are obtained between the gauge 12 and the cylinder 11: by maintaining these contact points and rotating the cylinder 11, the geometry (eccentricity, rotundity) is revealed of the section of the same in correspondence with the clamps by means of appropriate algorithms. With the same configuration, but maintaining the cylinder at a standstill, it is possible, on the contrary, to reveal the absolute diameter of the cylinder 11. By keeping the cylinder still and translating the gauge for the whole length of the surface of the cylinder, it is possible to reveal the profile of the generatrix of the cylinder itself.

At the end of the measurement, the movable arm 62 of the gauge returns to a rest position and the upper arm is lowered until it reaches rest position due to its weight. The descent of the upper arm causes the simultaneous rising of the lower arm.

The objective mentioned in the preamble of the description has therefore been achieved.

There can naturally be numerous embodiment forms of the apparatus of the invention.

The protection scope of the invention is delimited by the enclosed claims.

The invention claimed is:

1. An apparatus for revealing a geometry of operative cylinders, in particular during a grinding operation of the cylinders, comprising:
   a pair of clamps (13, 14) configured to be moved away from and towards each other with respect to a fixed intermediate structure (15),
   said clamps (13, 14) having tilted surfaces (19, 20) in opposite diverging directions from each other with respect to a cylinder (11) to be measured, said clamps being configured to have the cylinder positioned therebetween and between a surface (21) of said fixed intermediate structure (15),
   wherein said surfaces (19, 20) of said clamps (13, 14) and said surface (21) of said fixed intermediate structure (15) are always kept in contact with said cylinder (11) regardless of whether said cylinder is still or rotating,
   wherein said fixed structure (15) has, in its interior, parts of a group which interact with each other (32, 33; 29, 43; 28, 35, 36, 37, 38) to correlate a movement of said clamps (13, 14),
   wherein said group comprises upper movable arms or parts (32) and lower movable arms or parts (33) carrying said clamps (13, 14) and connected in synchronous movement in opposite directions with a cable or wire system (43) and pulley (29), and
   wherein said upper and lower movable arms or parts have different weights, said upper movable arm or part (32) having a greater weight than said lower movable arm or part (33), wherein a difference in weight between the said upper and lower movable parts or arms lifts the lower movable arm or part (33).

2. An apparatus for revealing a geometry of operative cylinders, in particular during a grinding operation of the cylinders, comprising:
   an upper and a lower clamps (13, 14) configured to be moved away from and towards each other with respect to a fixed intermediate structure (15),
   said clamps (13, 14) having tilted surfaces (19, 20) in opposite diverging directions from each other with respect to a cylinder (11) to be measured, said clamps being configured to have the cylinder positioned therebetween and between a surface (21) of said fixed intermediate structure (15),
   wherein said surfaces (19, 20) of said clamps (13, 14) and said surface (21) of said fixed intermediate structure (15) are always kept in contact with said cylinder (11) regardless of whether said cylinder is still or rotating,
   wherein said fixed structure (15) has, in its interior, parts of a group which interact with each other (32, 33; 29, 43; 28, 35, 36, 37, 38) to correlate a movement of said clamps (13, 14),
   wherein said group comprises upper movable arms or parts (32) and lower movable arms or parts (33) carrying said clamps (13, 14) and connected in synchronous movement in opposite directions with a cable or wire system (43) and pulley (29), and
   wherein said cable or wire system (43) and pulley (29) has an end of a wire (43) that is constrained to a stop (28) constrained to said upper arm (32), said wire (43) being wound onto said pulley (29), situated in an upper part of the fixed structure (15), after effecting a half-turn around the pulley (29), and descending to be connected to said lower arm (33) passing through a first block (35), integral with the wire (43), but not with the lower arm (33), a second block (36) integral with the lower arm (33), but not with the wire (43) running freely in a hole of the block (36), and a third block (37), integral with the other end of the wire (43) forming a final stop and a reaction point for a preloaded spring (38) which provides for a continuous contact between the upper clamp (13), the lower clamp (14) and the cylinder (11).

3. The apparatus according to claim 2, wherein the apparatus is configured for use with different distances between a contact point between the cylinder (11) and the upper clamp (13) and an axis of the cylinder and a contact point between the cylinder (11) and the lower clamp (14) and the axis of the cylinder.

4. A method for revealing a geometry of operative cylinders, in particular during a grinding operation, comprising:
   positioning a cylinder (11) to be reconditioned in an apparatus comprising a pair of clamps (13, 14) comprising an upper clamp and a lower clamp configured to be moved away from and towards each other with respect to a fixed intermediate structure (15);
   providing the clamps (13, 14) with tilted surfaces (19, 20) in opposite diverging directions with respect to the cylinder (11) to be positioned between the clamps and between a surface (21) of said fixed intermediate structure (15); and
   keeping said surfaces (19, 20) of said clamps (13, 14) and a surface (21) of said fixed intermediate structure (15) always in contact with said cylinder (11) regardless of whether the cylinder is still or rotating,
   further comprising the step of providing parts of a group which interact with each other (32, 33; 29, 43; 28, 35, 36, 37, 38) in an interior of said fixed structure (15), said parts causing a movement of said clamps (13, 14) arranged on upper (32) and lower (33) arms, wherein said arms (32, 33) are moved synchronously in opposite directions, and wherein said upper and a lower arms (32, 33) have different weights, said upper arm (32) having a greater weight than said lower arm (33), wherein a difference in weight between the upper and lower arms lifts the lower arm (33), wherein a reduction in the diameter of the cylinder (11) causes a contact point (16) between the upper clamp (13) and the cylinder (11) to occur by a downward shift of the upper arm (32) due to gravity, said shift of the upper arm (32) causing an equal and contrary shift of the lower arm (33) due to a connection, with a wire (43), of a spring (38) and the difference in weight so that the upper and lower clamps (13, 14) are always in contact with the cylinder (11).

5. The method according to claim 4, wherein if an upper contact point moves towards a central direction, the upper arm descends due to gravity and a tension of the wire compresses the spring (38) by an amount equal to a shift being considered, this shift generating an increase in preloading of the spring (38), a weight force of the upper arm generating the preloading, thus always providing contact of the upper and lower clamps (13, 14) with the cylinder (11).

6. The method according to claim 4, wherein if an upper contact point moves away from center, the upper arm is lifted as it is pushed by a profile of the cylinder, a consequent loss of tension of the wire being compensated by an extension of the spring (38), equal to a shift being considered, the compensating the shift, until an initial preloading of the spring (38) is zeroed, thus always providing contact of the upper and lower clamps (13, 14) with the cylinder (11).

7. The method according to claim 4, wherein if a lower contact point moves towards center, the lower arm is lifted to maintain contact with the cylinder as it is pushed by the spring (38), which is unloaded by an amount equal to a shift being considered, the apparatus compensating the shift, until an initial preloading of the spring is zeroed, thus always proving contact of the upper and lower clamps (13, 14) with the cylinder (11).

8. The method according to claim 4, wherein if a lower contact point moves away from center, the lower arm is lowered compressing the spring (38), consequently increasing preloading, proper operation of the apparatus being provided as long as the preloading of the spring does not reach values which cause a detachment of the upper clamp form the cylinder, thereby always providing the contact of the upper and lower clamps (13, 14) with the cylinder (11).

9. A method for revealing a geometry of operative cylinders, in particular during a grinding operation, comprising:
    positioning a cylinder (11) to be reconditioned in an apparatus comprising a pair of clamps (13, 14) comprising an upper clamp and a lower clamp configured to be moved away from and towards each other with respect to a fixed intermediate structure (15);
    providing the clamps (13, 14) with tilted surfaces (19, 20) in opposite diverging directions with respect to the cylinder (11) to be positioned between the clamps and between a surface (21) of said fixed intermediate structure (15); and
    keeping said surfaces (19, 20) of said clamps (13, 14) and a surface (21) of said fixed intermediate structure (15) always in contact with said cylinder (11) regardless of whether the cylinder is still or rotating,
    further comprising the step of providing parts of a group which interact with each other (32, 33; 29, 43; 28, 35, 36, 37, 38) in an interior of said fixed structure (15), said parts causing a movement of said clamps (13, 14) arranged on upper (32) and lower (33) arms,
    wherein, as said arms (32, 33) have different weights, said upper arm (32) having a greater weight than said lower arm (33), wherein a difference in weight between the upper and lower arms lifts the lower arm (33), in the presence of an increase in the diameter of the cylinder (11), a contact point (16) between the upper clamp (13) and the cylinder (11) is provided by an upward shift of the upper arm (32) caused by a contact between said clamp (13) and the cylinder, said upward shift of the upper arm (32) causing a equal and contrary shift of the lower arm (33) due to a connection with a wire (43), of a spring (38) and the difference in weight so that the upper and lower clamps (13, 14) are always in contact with the cylinder (11).

* * * * *